(No Model.) 2 Sheets—Sheet 1.
C. J. MOORE & G. A. BURWELL.
BICYCLE SADDLE.

No. 496,665. Patented May 2, 1893.

WITNESSES
Carroll J. Webster.
Floyd R. Webster.

INVENTORS
Charles J. Moore
George A. Burwell
By William Webster
Atty (No Model.) 2 Sheets—Sheet 2.

C. J. MOORE & G. A. BURWELL.
BICYCLE SADDLE.

No. 496,665. Patented May 2, 1893.

WITNESSES
Carroll J. Webster
Floyd R. Webster

INVENTORS
Charles J. Moore
George A. Burwell
By William Webster
Atty

UNITED STATES PATENT OFFICE.

CHARLES J. MOORE AND GEORGE A. BURWELL, OF TOLEDO, OHIO, ASSIGNORS TO THE LOZIER MANUFACTURING COMPANY, OF SAME PLACE.

BICYCLE-SADDLE.

SPECIFICATION forming part of Letters Patent No. 496,665, dated May 2, 1893.

Application filed September 9, 1892. Serial No. 445,410. (No model.)

*To all whom it may concern:*

Be it known that we, CHARLES J. MOORE and GEORGE A. BURWELL, of Toledo, county of Lucas, and State of Ohio, have invented certain new and useful Improvements in Bicycle-Saddles; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to a saddle for bicycles, and has for its object to provide for resiliency of the springs, and adjustment to suit any weight of rider, with a direct tension upon the saddle leather at all times.

A further object is to provide a yoke for securing the seat springs, that shall be readily detachable therefrom.

A further object is to provide a convenient fastening for the rear end of the spring, in connecting the same with the saddle.

The invention consists in the parts and combination of parts hereinafter described and pointed out in the claims.

Figure 1:
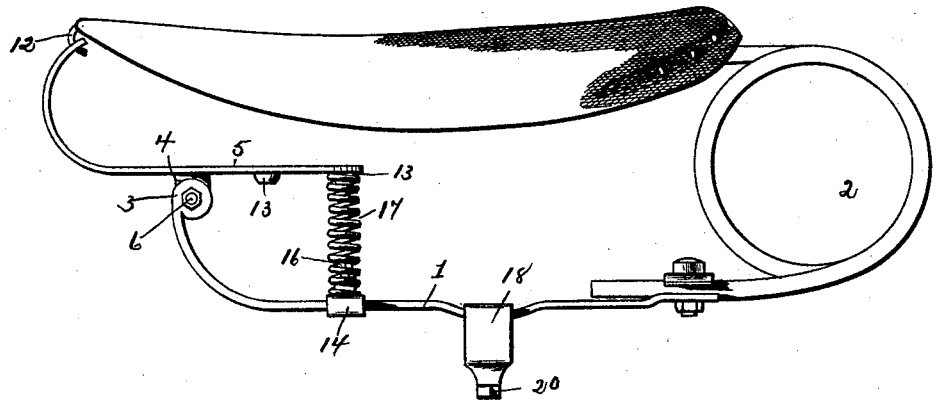
Figure 2:
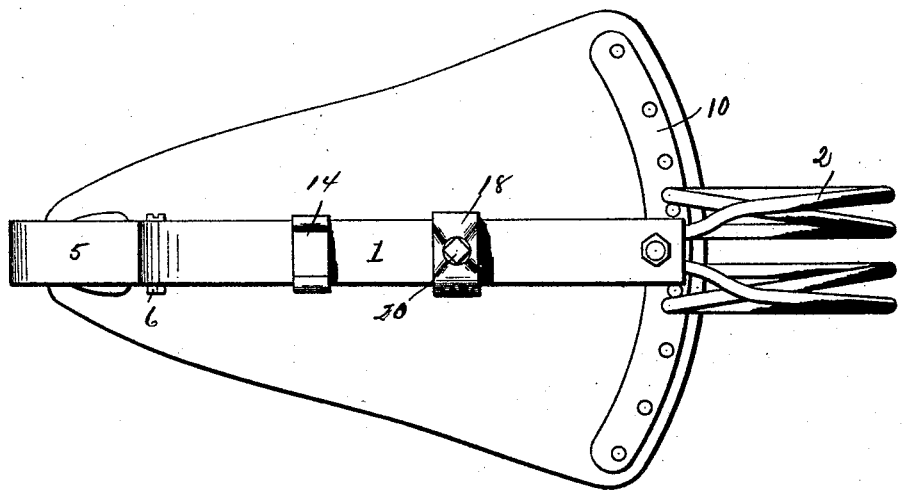
Figure 3:
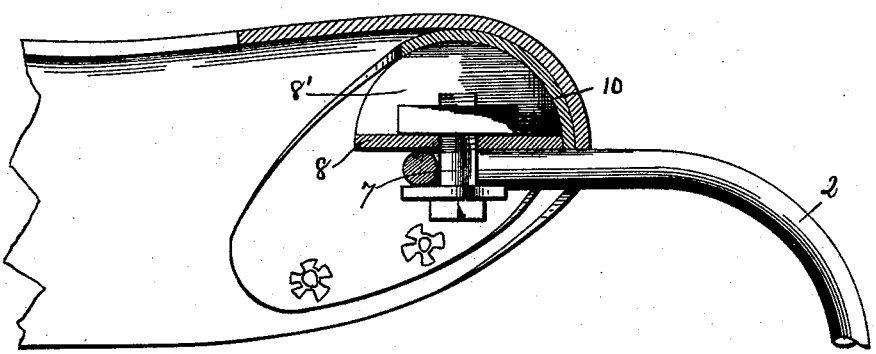
Figure 4:
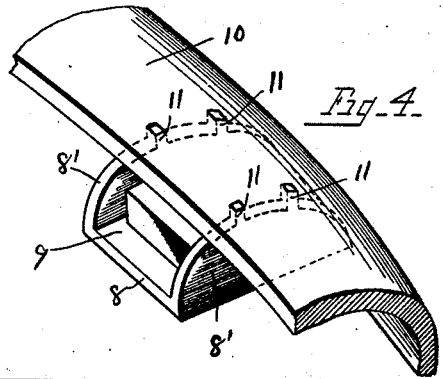
Figure 5:
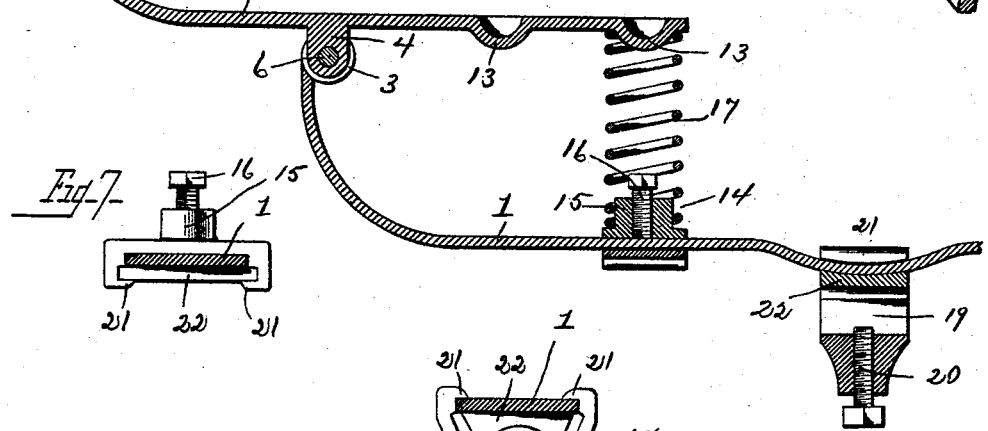
Figure 6:
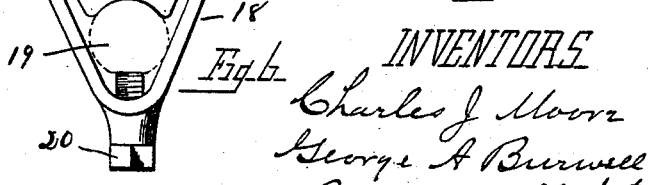

In the drawings: Figure 1 is a side elevation of a saddle constructed in accordance with our invention. Fig. 2 is a bottom plan view of the same. Fig. 3 is a longitudinal vertical sectional view of a section of saddle, showing the nut receptacle of the bolt, for securing the rear end of the spring to the saddle. Fig. 4 is an enlarged sectional detail view of a portion of the cantle. Fig. 5 is a longitudinal vertical sectional elevation of a portion of the spring, showing the plate spring, the fulcrumed spring lever, and the coiled spring support. Fig. 6 is a front elevation of the detachable yoke for securing the seat spring to the bicycle frame. Fig. 7 is a like view of the adjustable yoke, bearing the spring stop.

1 designates a spring, preferably in the form of a flat bar having a coiled spring 2 secured at the rear end the front end having transversely perforated ears 3 between which is pivotally sustained a transversely perforated boss 4, formed upon a spring lever 5, by means of a pin, bolt or rivet 6, whereby the spring lever may rock upon the pivot pin. The coiled spring 2 is secured at the free end to the rear end of the saddle by means of a bolt 7, the nut of which is secured from rotation by a housing comprising a plate 8, having the sides 8' bent at right angles to form a rectangular recess 9, the plate being secured to the cantle 10, by means of a plurality of lugs 11, passed through perforations in the cantle, and riveted. The free end of the spring lever 5 is secured to the front end of the saddle, leather, preferably by perforating the end and engaging a hook 12 in the perforation. The inner end of the lever 5 is formed with a plurality of bosses 13, upon the under side preferably by stamping the metal from the upper side to form a conical projection, there being a yoke 14 upon the spring formed with a boss 15, through which a set screw 16 is tapped, in order to allow of adjusting the yoke, to cause the boss to coincide with either of the bosses 13 upon lever 5, to secure a spiral spring 17 in the desired adjustment between the lever 5 and the spring.

18 designates a yoke upon a spring 1 having an opening 19 through which the angled end of the seat post is inserted and the seat held in adjustment by means of a set screw 20.

Yokes 14 and 18 are constructed to be readily adjusted upon, or removed from the spring, and are formed with the upper ends bent at right angles to form hooks 21 which engage with a plate 22 of the full width of the space between the arms, which space is slightly greater than the width of the spring, so that when plate 22 is removed, the yoke can be turned laterally upon the spring and to hook upon one side disengaged from the spring, when the yoke can be easily removed.

To assemble the parts the spring lever 5 is engaged with the hook 12, the rear spring is now secured to the rear end of the saddle leather by simply unscrewing the bolt 7 from the nut a sufficient distance to allow the wire of the spring to engage between the head of the bolt, or a washer thereon and the bottom of the housing when the bolt is screwed into the nut, until the head or washer confines the spring firmly in place. Spring 17 is now placed in position, with one end encircling the boss 15 and resting upon the square base of yoke 14, the upper end encircling one of the bosses 13 upon lever 5, when the seat is complete and ready to be secured to the seat post.

It will be seen that we have provided a compound spring by means of the spring 1, lever 5 and coiled spring 17 in which there is provision for adjustment to suit any weight of rider, as the spring 17 by its adjustment regulates the resiliency of the entire seat spring. As for instance if it is desired to cause the spring to be more rigid, the yoke 14 is moved into co-incidence with the next boss 13 toward the front end of the lever.

The removability of the yokes is a feature of great value as it dispenses with the necessity of uncoupling the spring from the seat, or taking the springs apart, to remove or place the yoke thereon. It will also be seen that by reason of the housing, secured directly to the cantle, it is convenient to secure or remove the rear end of the spring when desired.

We wish it understood that we may form the spring 1 of wire if desired, and that we may otherwise vary the construction widely without departing from the spirit of our invention.

What we claim is—

1. In a saddle for bicycles, a saddle leather, a spring support connected with the rear end, a lever connected with the forward end, the lever being pivotally connected intermediate its height with the forward end of the spring support, a spring interposed between the lever and spring support.

2. In a saddle for bicycles, a saddle leather, a spring support connected with the rear end, a lever connected with the forward end, the lever being pivotally connected intermediate its length with the forward end of the spring support, and a spring adjustably supported on the spring support, and bearing against the free end of the lever.

In testimony that we claim the foregoing as our own we hereby affix our signatures in presence of two witnesses.

CHARLES J. MOORE.
GEORGE A. BURWELL.

Witnesses:
WILLIAM WEBSTER,
CARROLL J. WEBSTER.